No. 696,695. Patented Apr. 1, 1902.
H. C. PORTER.
HORSESHOE.
(Application filed Dec. 27, 1901.)
(No Model.)
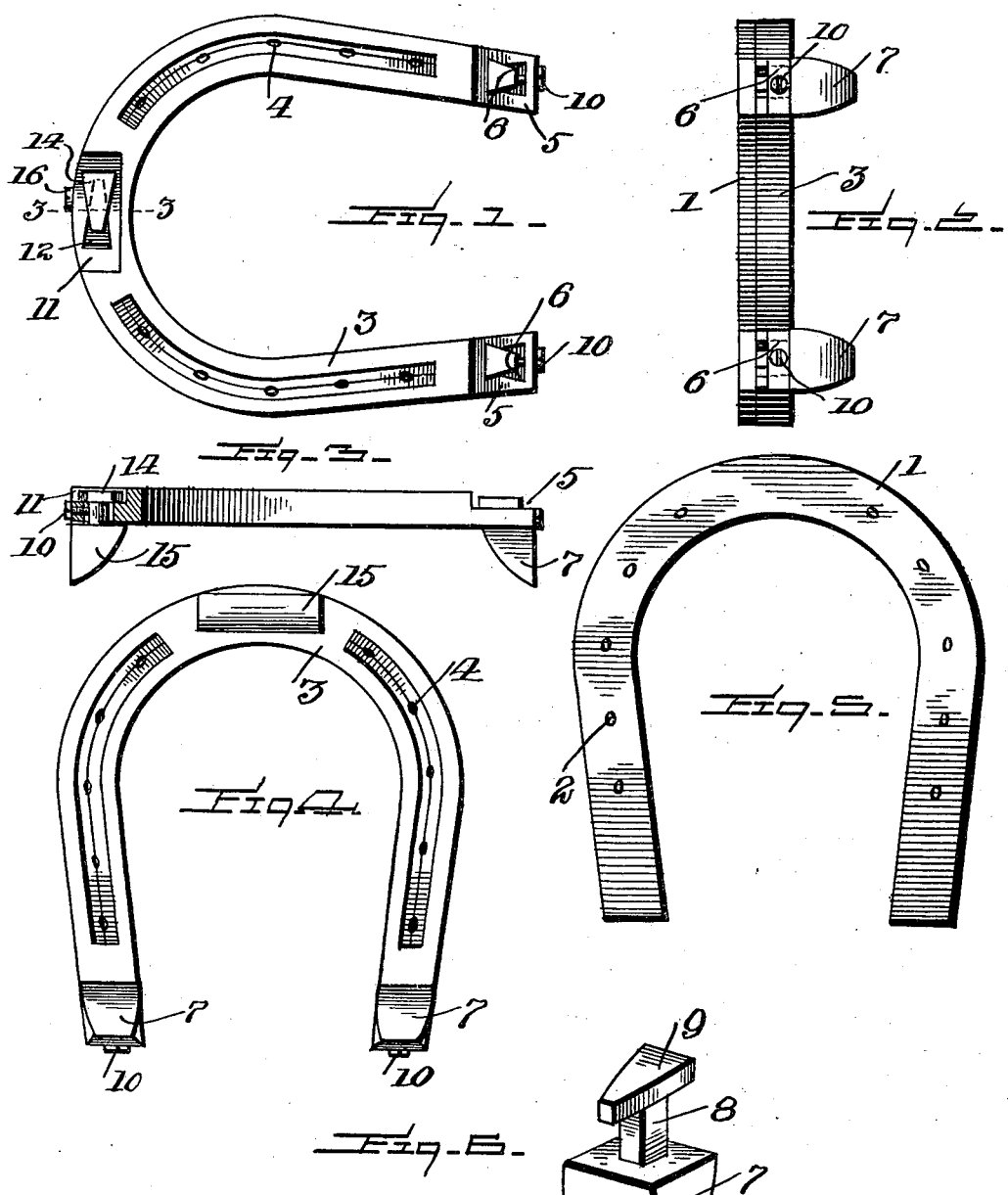
Witnesses:
Inventor
Harry C. Porter,
By
Attorneys.

UNITED STATES PATENT OFFICE.

HARRY C. PORTER, OF PITTSBURG, PENNSYLVANIA.

HORSESHOE.

SPECIFICATION forming part of Letters Patent No. 696,695, dated April 1, 1902.

Application filed December 27, 1901. Serial No. 87,407. (No model.)

*To all whom it may concern:*

Be it known that I, HARRY C. PORTER, a citizen of the United States of America, residing at Pittsburg, in the county of Allegheny and State of Pennsylvania, have invented certain new and useful Improvements in Horseshoes, of which the following is a specification, reference being had therein to the accompanying drawings.

This invention relates to certain new and useful improvements in horseshoes, and relates more particularly to that class provided with removable calks and toe-plates.

The invention has for its object the provision of novel means whereby the calks and toe-plates may be readily removed from the horseshoe, the same then sharpened, and replaced.

Another object of the present invention is to provide a base-plate to which the horseshoe is to be secured.

The invention further aims to provide a horseshoe that will be extremely simple in its construction, strong, durable, comparatively inexpensive to manufacture, and highly efficient in its use.

With the above and other objects in view the invention consists in the novel combination and arrangement of parts to be hereinafter more fully described, and specifically pointed out in the claims.

In describing the invention in detail reference is had to the accompanying drawings, forming a part of this specification, and wherein like numerals of reference indicate like parts throughout the several views, in which—

Figure 1 is a top plan view of my improved horseshoe. Fig. 2 is an end view showing the toe-plate removed. Fig. 3 is a vertical sectional view taken on the line 3 3 of Fig. 1. Fig. 4 is an under plan view of my improved horseshoe. Fig. 5 is a similar view of the plate. Fig. 6 is an enlarged perspective view of one of the calks.

In the drawings the reference-numeral 1 represents the plate, which is formed in the shape of a horseshoe, having openings 2 to receive fastening means.

The reference-numeral 3 represents the horseshoe proper, having the opening 4, registering with the openings 2 of the plate, to receive fastening means. The said horseshoe has formed at its ends cut-away portions 5 5, having formed therein wedge-shaped openings 6 to receive the calks 7, the latter carrying the square shank 8 and the wedge-shaped head 9. The latter registers with the wedge-shaped opening 6.

The reference-numeral 10 represents set-screws for the purpose of retaining the calks in position when properly placed in the horseshoe.

The reference-numeral 11 represents a recess formed in the toe of the horseshoe, said recess having a wedge-shaped opening 12 to receive the wedge-shaped head 14 of the shank carrying the toe-plate 15, and 16 represents a set-screw to secure same in position.

The plate 1 and shoe 3 are applied to the horse's hoof in the usual manner, and the calks and toe-plates are then placed in the openings and turned, which will prevent the same from being displaced when the set-screws have been applied. It will be seen that by the herein-described improvements in horseshoes the calks and toe-plates may be easily removed and readily replaced without the necessity of removing the shoe. After the several calks have been placed in their respective positions the plate 1 is then placed over the under side of the shoe, with its apertures registering with those of the shoe. It will thus be noted that the plate 1 covers the heads carried by the calks and presents an even surface for engagement with the horse's hoof, the plate and shoe receiving the fastening means through the registering apertures and being simultaneously secured to the hoof.

It will be noted that various changes may be made in the details of construction without departing from the general spirit of my invention.

I am aware of the fact that horseshoes have been manufactured with removable calks and toe-plates, and I therefore do not claim this feature broadly as new.

I claim—

1. In a horseshoe of the character described, the combination of a plate, a horseshoe having cut-away portions at its ends and having wedge-shaped openings formed therein, said horseshoe having a recess and a wedge-shaped opening formed in the toe thereof, removable calks and a toe-plate carrying a square shank and wedge-shaped heads registering with said wedge-shaped openings in the horseshoe, and means whereby said calks and toe-plates are retained in position, substantially as set forth.

2. In a horseshoe of the character described, the combination of a plate, a horseshoe having cut-away portions at its ends and having wedge-shaped openings formed therein, said horseshoe having a recess and a wedge-shaped opening formed in the toe thereof, removable calks and a toe-plate carrying a square shank and wedge-shaped heads registering with said wedge-shaped openings in the horseshoe, and set-screws secured in the ends and toe of said horseshoe to prevent the displacement of said calks and toe-plate, substantially as described.

In testimony whereof I affix my signature in the presence of two witnesses.

HARRY C. PORTER.

Witnesses:
　JOHN NOLAND,
　E. E. POTTER.